United States Patent

[11] 3,600,930

| [72] | Inventor | Walter M. Posingies<br>Edina, Minn. |
|---|---|---|
| [21] | Appl. No. | 865,678 |
| [22] | Filed | Oct. 13, 1969 |
| [45] | Patented | Aug. 24, 1971 |
| [73] | Assignee | Honeywell, Inc.<br>Minneapolis, Minn. |

[54] BUILT IN TESTING EQUIPMENT FOR FLUID VORTEX DEVICE
6 Claims, 4 Drawing Figs.

| [52] | U.S. Cl. | 73/1 D, 73/505 |
|---|---|---|
| [51] | Int. Cl. | G01p 21/00 |
| [50] | Field of Search | 73/1 A, 1 D, 1 E, 505, 194, 194 C, 1 R |

[56] References Cited
UNITED STATES PATENTS

| 3,175,388 | 3/1965 | Ford et al. | 73/1 D |
|---|---|---|---|
| 3,417,624 | 12/1968 | Bowles et al. | 73/505 |

*Primary Examiner* — S. Clement Swisher
*Attorneys* — Charles J. Ungemach, Ronald T. Reiling and Charles L. Rubow

ABSTRACT: Null adjustment and calibration means for a fluid vortex device comprising one or more blade members which are positioned within, or may be inserted into the vortex chamber of the device remote from its central axis. For null adjustment purposes, a blade is permanently positioned within the chamber at such an angle as will provide rotational flow sufficient to compensate for existing null offset. For calibration purposes, a blade is temporarily positioned within the chamber at the angle required to simulate a predetermined input signal.

INVENTOR.
WALTER M. POSINGIES

BY Ronald T. Reiling

ATTORNEY

INVENTOR.
WALTER M. POSINGIES
BY Ronald T. Reiling
ATTORNEY

BUILT IN TESTING EQUIPMENT FOR FLUID VORTEX DEVICE

BACKGROUND OF THE INVENTION

This invention pertains to fluid vortex devices, and more particularly to null adjustment and calibration means for such devices.

A fluid vortex device is a device which makes use of vortical fluid flow in performing any of a variety of functions. Such functions include amplification of fluid signals and sensing of angular rates. Both of these functions are frequently combined in a single device referred to by those skilled in the art as a vortex rate sensor. The applicant's invention will be described in connection with a vortex rate sensor, but is by no means limited to such an application.

One of the characteristics of a fluid vortex device which is used to great advantage is its large amplification capability. This capability permits a vortex rate sensor to produce a useful output signal in response to a very small external motivation in the form of a rate input.

The structure of a vortex rate sensor is such that the fluid flow field is produced therein which, in the absence of external motivation, closely approximates classical two dimensional pure sink flow having only radial velocity. When a vortex rate sensor is subject to angular acceleration, a tangential velocity relative to the sensor housing is superimposed upon the pure sink flow. The superimposition of the pure sink flow and the tangential flow results in flow in which the fluid streamline pattern is a logarithmic spiral.

To satisfy the equation of continuity, the radial velocity of the pure sink flow will increase as the fluid approaches the sink or exit passage of the vortex rate sensor. Due to the principle of conservation of angular momentum, the tangential or rotational velocity of the flow will also increase as the exit passage is approached. Specifically, the tangential velocity varies inversely with radius. Thus, if a device has a 10-inch diameter vortex chamber and a centrally located 0.1-inch diameter exit passage, a theoretical amplification of 100 is provided.

A signal pickoff is located in the vortex rate sensor exit passage for sensing angular or tangential fluid velocity therein. A common type of signal pickoff comprises a blade element extending into the exit passage and positioned so that a chord thereof is aligned with the central axis of the exit passage. As the rotational or tangential velocity of fluid flowing through the exit passage varies, its angle of attack upon the blade element also varies, thus creating a pressure differential thereacross. This pressure differential is sensed by appropriately located pressure ports.

Although the large amplification of a vortex device is advantageous, it is also the source of certain problems. One of the serious problems in fluidic systems using fluid vortex devices in general, and vortex rate sensors in particular, is null offset (i.e., an output signal when no input to the device is present). This null offset is due to small asymmetries which result from practical limitations in the manufacture and fabrication of the vortex device and pickoff combination. Particularly with respect to the pickoff, the asymmetries are often so small as to defy detection, much less correction during the manufacturing and fabrication process.

In the past, it has been attempted to provide null adjustment by slightly shifting the pickoff. This adjustment is extremely sensitive, thus making it difficult to achieve a satisfactory null. Further, it is necessary to anchor the pickoff to the vortex device housing. Pressurization of the housing in normal operation causes deflection sufficient to upset the null adjustment.

It has also been found difficult to manufacture a satisfactory adjustable pickoff. In order to achieve an accurate null with a typical blade pickoff, it is normally necessary to rock the blade with respect to the exit passage. This must be done without changing any other geometry of the exit passage, and without allowing any leakage from the exit passage adjacent the blade. These requirements are difficult to achieve. Additional intolerable distortion of the exit passage frequently occurs as the blade is locked in place after adjustment.

One reason for the extreme sensitivity of a pickoff to geometrical adjustment is that the pickoff senses very small angles between direction of fluid flow through the exit passage and the passage axis. Further, a substantial portion if not all of the fluid flowing through the vortex device acts on the pickoff. The present null adjustment technique avoids the extreme sensitivity of pickoff adjustments by affecting only a small percentage (typically 0.01percent) of the total fluid flowing through a vortex device.

SUMMARY OF THE INVENTION

The applicant's null adjustment and calibration means comprises blade means movably mounted in the housing of a vortex device remote from its central axis. The blade means is oriented so that the chord thereof is generally aligned with a radius of the vortex chamber. Positioning means is provided for positioning the blade means so as to cause a predetermined rotational velocity of fluid in the chamber sufficient to compensate for any null offset. Calibration of the vortex device can also be accomplished by temporarily rotating the blade element through a predetermined additional angle, thereby simulating a predetermined input signal. Alternately, this can be accomplished by temporarily inserting into the chamber a blade element whose chord makes a predetermined angle with a radius of the chamber.

Null adjustment techniques according to the applicant's teachings are capable of providing very fine, smoothly variable alterations to the pickoff output signal. In addition, calibration techniques according to the applicant's teachings are capable of providing accurate calibration of a vortex device. Finally, it has been discovered that the presence of blade means, as taught by the applicant, in the vortex chamber of a vortex device does not cause excessive or prohibitive noise in the device operation.

DESCRIPTION OF THE PREFERRED EMBODIMENTS

Figure 1:
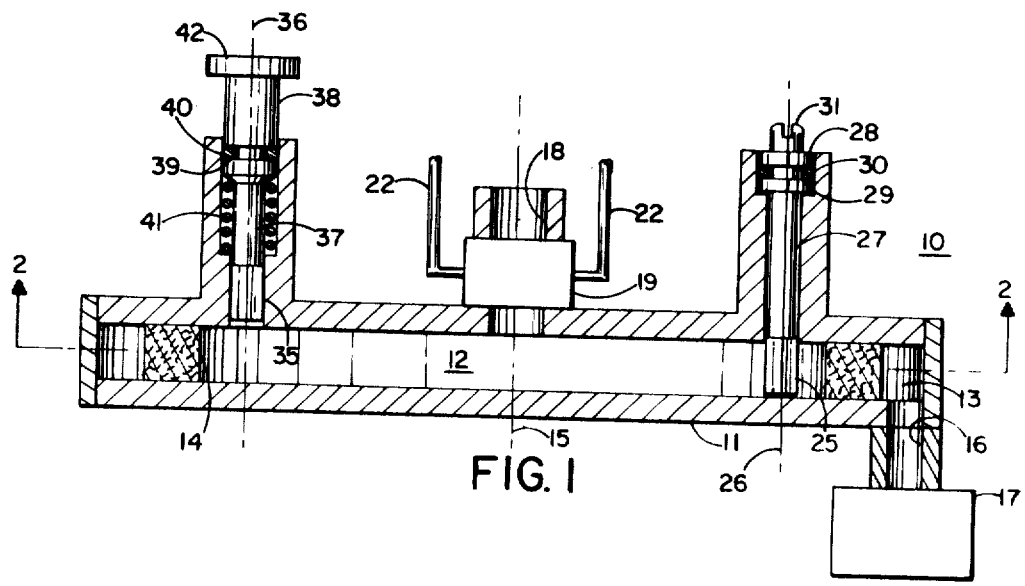
FIG. 1 is a sectional view, taken along lines 1—1 in FIG. 2, of a vortex rate sensor including one embodiment of the applicant's null adjustment and calibration means.
Figure 2:
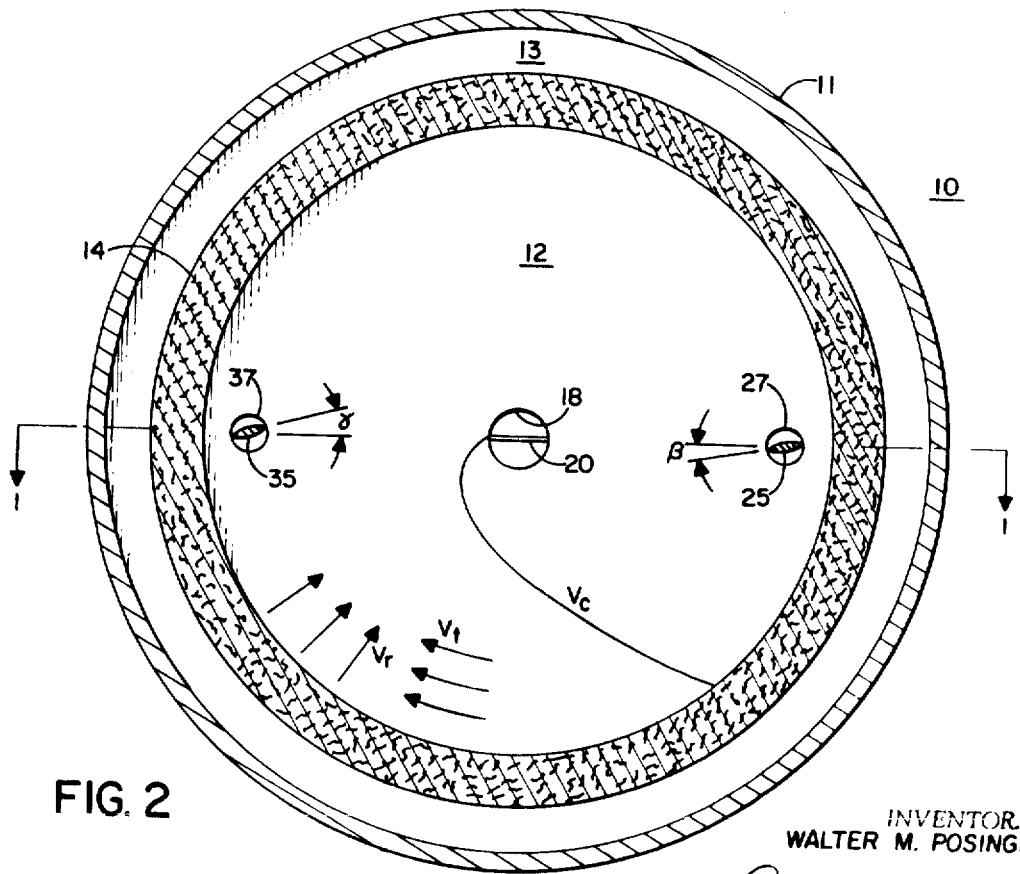
FIG. 2 is a sectional view taken along lines 2—2 in FIG. 1 showing the geometrical relationships of the blade means to remainder of the device.

In FIGS. 1 and 2, reference numeral 10, generally refers to a vortex rate sensor including null adjustment and calibration means according to the teachings of the applicant's invention. Sensor 10 comprises a housing 11 which encloses a vortex chamber 12 surrounded by a supply plenum 13. Vortex chamber 12 and supply plenum 13 are separated by a porous coupling element 14. Coupling element 14 is constructed of any suitable material which will allow only substantially radial flow into chamber 12 from plenum 13. The inner surface of element 14 defines the periphery of vortex chamber 12 which is shown as a circular in cross section and symmetrical about a central axis 15.

Sensor 10 also includes a fluid inlet 16 for supplying fluid to plenum 13 from a fluid source 17. An exit passage 18 for exhausting fluid from chamber 12 is aligned with axis 15. Passage 18 exhausts into a fluid sink of lower pressure than source 17. It is pointed out that although only one exit passage is shown, a second such passage aligned with axis 15 on the opposite side of sensor 10 can also be provided.

A signal pickoff 19 is associated with exit passage 18. Pickoff 19 may be of any one of a number of well known types commonly used with vortex devices. The pickoff illustrated comprises a blade element 20 (shown in FIG. 2) extending at least partially across exit passage 18 and having a cord aligned with axis 15. A plurality of pressure ports are associated with the blade element and sense pressure differentials thereacross resulting from the angle of attack at which fluid in passage 18 approaches the blade. Since the angle of attack varies with variations in rotational velocity of fluid in passage 18, the pressure differentials sensed are indicative of angular acceleration or rate input to sensor 10. The pressure ports communicate conduits 22 which transmit signals therefrom to any suitable utilization apparatus.

The embodiment of the applicant's invention shown in FIGS. 1 and 2 comprises a first blade member 25 extending into chamber 12 along an axis 26 which is parallel to axis 15, but separated therefrom. Blade member 25 preferably has a streamlined cross section in a plane perpendicular to axis 26 as viewed in FIG. 2. Blade member 25 is fixed to a shaft 27 which is rotatably mounted in housing 11. Shaft 27 includes a portion 28 of enlarged diameter having a groove 29 therein for receiving an O-ring 30. O-ring 30 forms a fluid seal between housing 11 and shaft 27. The end of shaft 27 opposite blade member 25 is provided with a slotted head 31 which comprises means accessible from outside sensor 10 for rotating blade 25 about axis 26.

The embodiment of the applicant's invention shown in FIGS. 1 and 2 further comprise a second blade member 35 extending along an axis 36 parallel to axis 15, but spaced therefrom. Blade member 35 preferably has a streamlined cross section in a plane perpendicular to axis 36 as shown in FIG. 2. Blade member 35 is fixed to shaft 37 which is slideably mounted in housing 11. Shaft 37 includes a portion 38 of enlarged diameter having a groove 39 therein for holding an O-ring 40. O-ring 40 forms a fluid seal between housing 11 and shaft 37. Shaft 37 is slideable in housing 11 along axis 36 so that blade 35 may be translated into chamber 12.

A compression spring 41 surrounding shaft 37 is provided between shoulders in housing 11 and on shaft 37 for normally holding blade 35 out of chamber 12. A head 42 on shaft 27 is provided to facilitate movement of blade 35 into chamber 12 along the axis 36. Any conventional means for retaining shafts 27 and 37 in housing 11 may be provided. Such means (not shown) may comprise a retaining clip affixed to housing 11 cooperating with shoulders or grooves in shafts 27 and 37. Further, means (not shown) for preventing rotation of shaft 37 in housing 11 are also provided. Any conventional means may be used. Such means may comprise a square portion of shaft 37 or portion 38 cooperating with a square hole in housing 11.

In operation, a pressure differential exists between coupling element 14 and exit passage 18. Consequently, fluid flows from coupling means 14 through chamber 12 and out of exit passage 18. In the absence of external motivation (angular acceleration about axis 15), the fluid flow has substantially only radial velocity as illustrated by vectors $V_r$ in FIG. 2.

If external motivation in the form of angular acceleration about axis 15 is applied to sensor 10, the fluid within chamber 12 acquires a rotational velocity with respect to housing 11 as illustrated by vectors $V_t$. The tangential or rotational velocity relative to housing 11 of fluid at any point in chamber 12 is given by the formula: $V_t = \alpha r_a / r$ where $\alpha$ is the angular acceleration, $r_a$ is the radius of chamber 12, and $r$ is the radius to the point of interest. It is clear from the above formula that the tangential or rotational velocity increases as the fluid approaches exhaust passage 18. When sensor 10 is subjected to an angular rate input, fluid flow through passage 18 follows helical paths as a result of the superimposed radial and tangential components of fluid flow through chamber 12 as illustrated by path $V_c$.

In the absence of input acceleration, the fluid flow through chamber 12 has only substantially radial velocity and fluid flow through exit passage 18 is substantially entirely parallel to axis 15. Under these conditions, a zero pressure differential should be developed between pickoff conduits 22. However, due to unavoidable asymmetries resulting from manufacturing and fabrication irregularities, many vortex rate sensors produce a nonzero pressure differential between conduits 22 when no external motivation (angular acceleration) is present. For reasons previously pointed out, it has been found extremely difficult to correct this null offset by shifting or adjusting blade 20 with respect to the remainder of sensor 10.

The applicant has found that critical adjustments to blade 20 can be avoided by compensating for existing null offset by establishing a counteracting flow of the required magnitude in the chamber 12. More particularly, the applicant has discovered that a rotational flow of the proper magnitude can be established by means of a small blade member identified by reference numeral 25 in FIGS. 1 and 2. Blade member 25 extends into chamber 12 along axis 26 which is parallel to axis 15, but separated therefrom. Blade member 25 may be oriented so that a small angle $\beta$ is formed between a chord thereof and a radius of chamber 12. It has been found that critical adjustments to the orientation angle of blade element 25 are not required to achieve the desired flow pattern. Further, it has been found that such a blade member does not introduce excessive or prohibitive noise into operation of sensor 10.

The present null adjustment technique avoids the extreme sensitivity of pickoff adjustments by affecting only a small percentage (typically 0.01 percent ) of the total fluid flowing through sensor 10. This is accomplished by appropriately sizing blade member 25 and spacing it a relatively large distance from exit passage 18. Thus, blade 25 can be rotated over a reasonable range of angles without having an excessive effect on the pickoff output signal. For example, if a 0.2°shift in the flow angle at signal pickoff 19 is required to achieve null and the gain of sensor 10 is 100, a 0.002°shift in the average angle of flow with respect to a radius of chamber 12 is required at the periphery of the chamber. If blade member 25 is located at the periphery of the chamber and affects 0.1 percent of the total fluid flowing through the chamber, setting blade 25 so that a 2°angle is formed between a chord thereof and a radius of the chamber will provide a null output signal from pickoff 19.

Calibration of a fluidic system including a vortex device can be accomplished using the same technique as used for null adjustment. In the past, calibration of a fluidic system including a vortex device has typically been accomplished by introducing fluid signals downstream from the vortex device and obtaining calibration data at the system output. This has been adequate in most instances since it has been found that calibration of a vortex device usually does not vary after the device has been fabricated and installed in a system. However, since it is generally good practice when calibrating a system to include as much of the system as possible in the calibration procedure, it is desirable to include a vortex device which produces the input signal.

The apparatus according to the applicant's invention provides means for conveniently inserting a calibration signal near the input to the vortex device. As shown in FIGS. 1 and 2, such a signal is introduced by means of blade member 35. Blade member 35 is oriented such that a predetermined angle $\gamma$ is formed between a chord thereof and a radius of chamber 12. Blade member 35 is normally withdrawn from chamber 12 by means of spring 41, although some other bias device can equally as well be used. For calibration purposes, blade 35 is temporarily inserted into chamber 12, thus effectively inserting a predetermined input signal by establishing a particular rotational flow pattern within chamber 12 in the same manner as such a flow pattern is established by blade member 25.

It is pointed out that the sensitivity of the null adjustment and/or calibration means can be tailored as appropriate for each application. Variables affecting sensitivity include blade size, depth of insertion into the vortex chamber, and distance of the blade from the exit passage. One or more of these variables can be changed as necessary to obtain the required sensitivity.

Figures 3, 4:
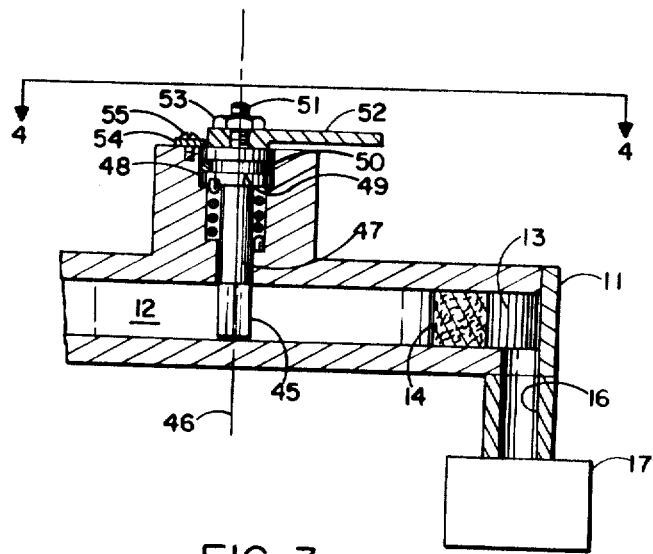
FIG. 3 is a partial sectional view of a vortex rate sensor including a second embodiment of the applicant's null adjustment and calibration means.
FIG. 4 is a detailed view of a portion of the second embodiment of the applicant's invention taken along lines 4—4 in FIG. 3.

A second embodiment of null adjustment and calibration means according to the applicant's invention is shown in FIGS. 3 and 4 wherein reference numerals 11 through 14, 16 and 17 identify the same parts of a vortex rate sensor as identified by those reference numerals in FIGS. 1 and 2. In FIGS. 3 and 4, only that portion of housing 11 necessary to disclose the applicant's invention is shown. The remaining portions of housing 11 have been broken away.

Reference numeral 45 identifies a blade member which extends into chamber 12 along an axis 46 parallel to, but spaced from the central axis of symmetry of chamber 12. Blade member 45 preferably has a streamlined cross section in a plane perpendicular to axis 46. Blade member 45 is fixed to a shaft 47 which is rotatably mounted in housing 11. Shaft 47 includes a portion 48 of enlarged diameter having a groove 49 therein for receiving an O-ring 50. O-ring 50 forms a fluid seal between housing 11 and shaft 47. The end of shaft 47 opposite blade member 45 is provided with a threaded stud 51 which extends through a lever 52. A nut 53 cooperating with stud 51 comprises means for securing lever 52 to shaft 47. A slot in stud 51 (shown in FIG. 4) comprises means whereby the orientation of blade member 45 with respect to lever 52 can be varied and held while nut 53 is tightened to fix the angular relationship therebetween. A retaining clip 54 is affixed to housing 11 by means of a screw 55, and serves to retain the shaft assembly in the housing.

A coil spring 55 surrounds the shaft 47 between a shoulder in housing 11 and portion 48 of shaft 47. Opposite ends of spring 55 protrude into holes in the housing 11 and portion 48 of shaft 47 respectively. Spring 55 comprises means for biasing the shaft assembly so that lever 52 normally rests against a nonadjustable stop 56 affixed to housing 11. Accordingly, blade member 45 is normally oriented so that a predetermined small angle exists between a chord thereof and a radius of chamber 12. This small angle may be varied by changing the angular relationship between blade member 45 and lever 52 by means of nut 53.

For purposes of null adjustment, blade member 45 is set at the orientation which will produce the rotational flow in chamber 12 necessary to compensate for existing null offset. For calibration purposes, lever 52 is rotated against an adjustable stop comprising screw 57, the threaded portion of which mates with threads in a portion of housing 11. Rotating lever 52 against the end of screw 57, the threaded portion of which mates with threads in a portion of housing 11. Rotating lever 52 against the end of screw 57 changes the angular orientation of blade member 45 with respect to housing 11 by an additional angle depending on the setting of the screw. Changing the orientation of blade member 45 thus effectively inserts a predetermined input signal by establishing a particular rotational flow pattern within chamber 12 as hereinbefore discussed. Screw 57 is set to obtain the desired calibration signal. Spring 55 causes blade member 45 to return to its null adjusting position when lever 52 is released.

In accordance with the foregoing discussion, it can be seen that the applicant has provided simple, reliable means for nulling and calibrating a fluid vortex device. Further, this null adjustment and calibration means is not excessively sensitive so as to require highly critical adjustments. Although certain embodiments of the applicant's invention are shown in detail, it will be understood that null adjustment and calibration can be accomplished with a variety of structural variations of the disclosed embodiments without departing from the applicant's teachings.

I claim:

1. In combination with fluid vortex apparatus including a housing defining a chamber radially symmetrical about an axis, fluid in said chamber being responsive to external motivation to acquire a rotational velocity about said axis, means for introducing fluid into said chamber at a relatively large radius so that it has substantially no rotational velocity about said axis, axially positioned means for exhausting fluid from said chamber at a radius substantially smaller than said relatively large radius, and signal means for producing a signal indicative of substantially only the rotational velocity of fluid in said chamber, the improvement which comprises:

blade means having a streamline cross section for selectively imparting rotational flow moveably mounted in said housing remote from said axis; and positioning means for positioning said blade means so as to cause a predetermined rotational velocity of fluid in said chamber whereby a predetermined signal is produced by said signal means when no external motivation is applied to said vortex apparatus.

2. The apparatus of claim 1 wherein said blade means includes a rotatable blade member extending into said chamber along a second axis parallel to and remote from said first named axis; and said positioning means comprises means accessible from the outside of said housing for varying the angle between a chord of said rotatable blade member and a radius of said chamber so that a null signal is produced by said signal means when no external motivation is applied to said vortex apparatus.

3. The apparatus of claim 2 wherein said blade means further includes a translatable blade member extending along a third axis parallel to and remote from said first named axis, a chord of said second blade member forming a fixed angle with a radius of said chamber; and said positioning means further comprises means accessible from the outside of said housing for temporarily inserting said second blade member into said chamber.

4. The apparatus of claim 1 wherein said blade means comprises a rotatable blade member extending into said chamber along a second axis parallel to and remote from said first named axis; and positioning means comprises means accessible from the outside of said housing for rotating said blade member to either of first and second positions, said blade member in the first position producing a flow pattern within said chamber so that said signal means produces a null signal in the absence of external motivation, said blade member in the second position producing a flow pattern within said chamber so that said signal means produces a predetermined signal different from said null signal in the absence of the external motivation.

5. Flow adjustment apparatus for a fluid vortex device including a cylindrical chamber radially symmetrical about a first axis, means for radially introducing fluid into said chamber proximate the periphery thereof, means proximate said first axis for exhausting fluid from said chamber, and signal means for producing a signal indicative of substantially only the rotational velocity of fluid in said chamber, said rotational velocity varying in response to external motivation, said flow adjustment means comprising:

a rotatable blade member extending into said chamber along a second axis parallel to and remote from said first axis; and means for rotating said first blade member about said second axis to a position to control the rotational velocity of fluid in said chamber so that said signal means produces a null signal in the absence of external motivation.

6. The flow adjustment means of claim 5 further including a second blade member extending along a third axis parallel to and remote from said first axis a chord of said second blade member forming a fixed angle with a radius of said chamber; and means for temporarily inserting said second blade member into said chamber, thereby causing a predetermined rotational velocity of fluid in said chamber whereby said signal means produces a predetermined signal.

75